United States Patent [19]
Kimberley

[11] Patent Number: 5,632,353
[45] Date of Patent: May 27, 1997

[54] PEDESTAL ARRANGEMENT FOR MOTOR GRADERS

[75] Inventor: James E. Kimberley, Goderich, Canada

[73] Assignee: Champion Road Machinery Limited, Goderich, Canada

[21] Appl. No.: 351,124

[22] Filed: Nov. 30, 1994

[30] Foreign Application Priority Data

Sep. 30, 1994 [CA] Canada ................................. 2133364

[51] Int. Cl.⁶ ............................................................... B62D 1/02
[52] U.S. Cl. ........................... 180/326; 180/334; 280/775; 74/493
[58] Field of Search ................................ 180/334, 326; 280/775; 74/493

[56] References Cited

U.S. PATENT DOCUMENTS

| | | | |
|---|---|---|---|
| 4,209,074 | 6/1980 | York | 280/775 |
| 4,291,896 | 9/1981 | Koch | 74/493 |
| 4,580,647 | 4/1986 | Peifer et al. | 180/326 |
| 4,664,220 | 5/1987 | Ruhter et al. | 180/334 |
| 4,682,787 | 7/1987 | Ruhter et al. | 180/334 |
| 4,706,776 | 11/1987 | Hyoki et al. | 280/775 |
| 4,821,837 | 4/1989 | Fifer | 180/334 |

Primary Examiner—Eric D. Culbreth

[57] ABSTRACT

A pedestal control console is disclosed which includes a trapezoidal linkage for moving control actuators and a steering wheel forwardly and rearwardly, according to an operator's requirement. The console includes a narrow footprint at the base thereof to improve visibility past the console. The console includes a back upright pivotally secured on a shaft at the base of the console. This shaft also supports bell cranks connected by connecting rods to actuators at the upper part of the console. The actuators are widely spaced at the upper part of the console and the connecting rods converge to the narrow footprint at the base of the console.

11 Claims, 3 Drawing Sheets

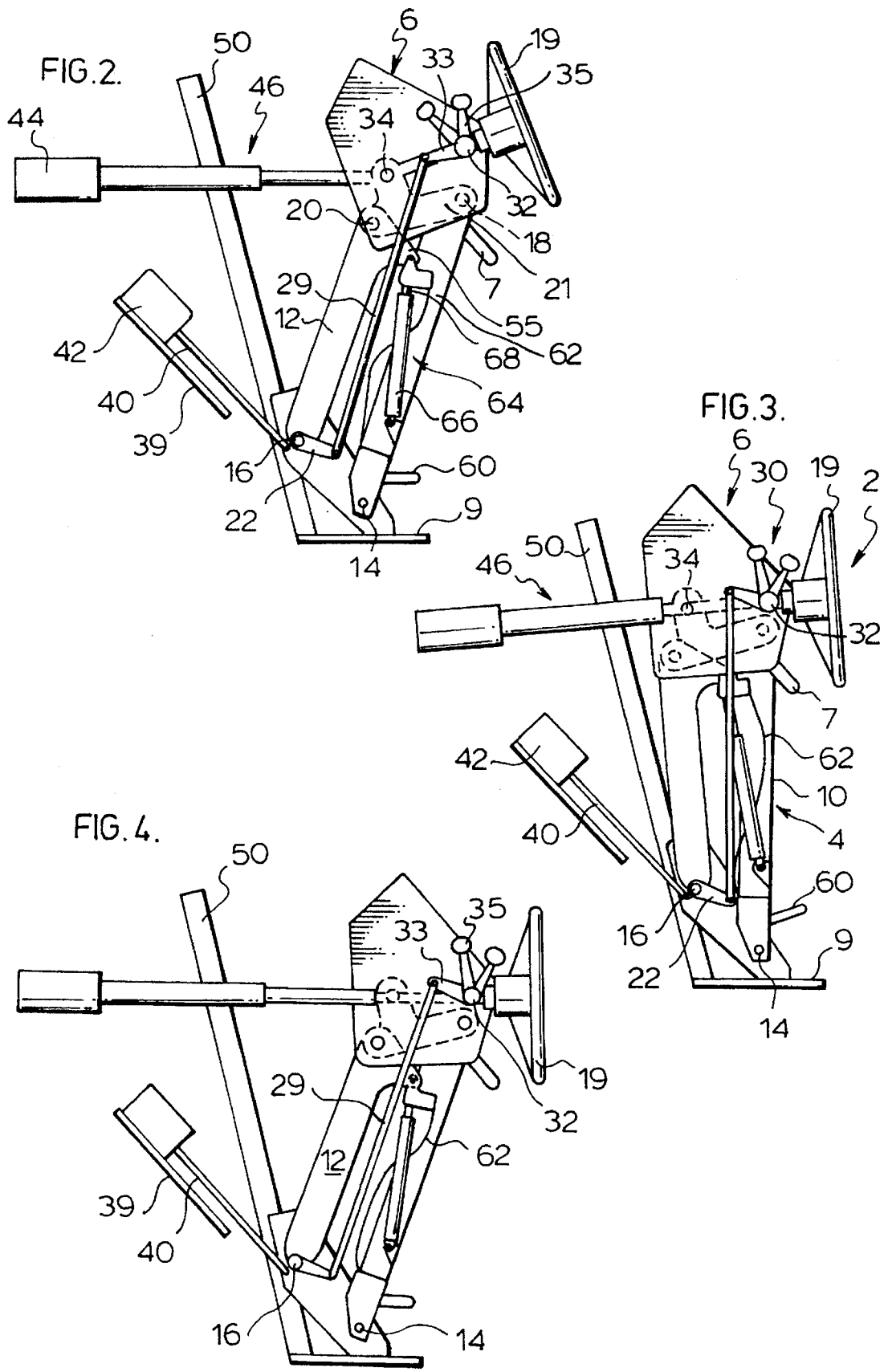

/ 1

PEDESTAL ARRANGEMENT FOR MOTOR GRADERS

FIELD OF THE INVENTION

The present invention relates to a pedestal control console of the type typically used in heavy construction machinery, such as motor graders. In particular, the invention relates to a particular pedestal console having improved characteristics.

BACKGROUND OF THE INVENTION

It has been long recognized that in certain vehicles it is necessary to have an adjustable console to allow the operator thereof to adjust the console for his particular needs when operating the vehicle. Typically, the pedestal console moves forwardly and rearwardly relative to an operator's seat. In most cases, the operator's seat is also highly adjustable to further allow the operator to customize the relation for his particular requirements.

Various arrangements have been proposed for locking of the pedestal console in one of a host of positions and these structures include both mechanical locking arrangements and hydraulic locking arrangements.

In some applications, such as motor graders, in addition to being able to provide a high degree of flexibility to allow the operator to adjust the operating position, there is a requirement to provide good visibility either side of the console to allow effective operation of the grader. Grader cabs normally have very large windows at the front and in the doors of the cab to allow the operator to view the operating area about the grader, and in particular the blade position.

A typical adjustable control console is shown in U.S. Pat. No. 3,737,003. This particular design uses a mechanical latching arrangement. Other designs have used a hydraulic locking arrangement where a piston and cylinder having a valve to allow hydraulic fluid to flow from one side of the piston to the other when the valve is opened, and essentially lock the piston relative to the cylinder when the valve is closed. Some of these designs have also accommodated the mechanical linkage arrangement between the various actuators pivotally mounted on a shaft, which cooperate with a bell cranks adjacent the base of the control console.

The prior art approaches are more complicated than required and are often difficult to service. In particular, adjustment of the linkages at the base of the pedestal can be awkward.

SUMMARY OF THE INVENTION

A pedestal control console according to the present invention comprises two opposed upright base plates with the opposed base plates having two spaced pivot shafts extending thereacross. One of the pivot shafts pivotally secures a panel member which forms one component of a trapezoidal linkage with the other pivot shaft pivotally securing a back upright support which also forms part of said trapezoidal linkage. The panel member and the back upright support each are pivotally connected at a raised position to a steering head located generally atop the trapezoidal linkage. The tilting steering head includes control levers positioned either side thereof and pivotal about a common shaft. Each control lever when actuated in either a fore or aft direction drives a first connecting rod. Each first connecting rod is connected to a bell crank pivotally secured to the other pivot shaft and located between said opposed base plates and to one side of the back upright support. Each bell crank is connected to a second connecting rod associated with a valve of a hydraulic control valve block. The first connecting rods are bent to form a transition form the wide spacing thereof adjacent the tilting head to a narrow spacing between the base plates. The pedestal control console includes an adjustable link for locking of the console at various positions between a fully upright position and a fully reclined position to accommodate different preferences of different operators.

According to an aspect of the invention, the back upright member is a plate type member with the major surface thereof generally perpendicular to said panel member.

According to yet a further aspect of the invention, the adjustable link is an hydraulic cylinder having a foot operated release valve which when open allows adjustment thereof.

According to an aspect of the invention, the control console includes a telescopic steering column which extends and retracts in accordance with movement of said pedestal control console and connects to remotely located powered hydraulic steering unit.

According to an aspect of the invention, the pedestal control console is secured in a cab of a motor grader, and the hydraulic steering unit and the hydraulic control valve block are positioned exterior to the cab.

According to yet a further aspect of the invention, the adjustable link is a gas spring hydraulic cylinder having a release valve controlled by a foot pedal located adjacent the base of the control console.

BRIEF DESCRIPTION OF THE DRAWINGS

Preferred embodiments of the invention are shown in the drawings, wherein:

FIGS. 2 through 4 are side views of the control console showing various adjusted positions.

DETAILED DESCRIPTION OF THE PREFERRED EMBODIMENTS

Figure 1:
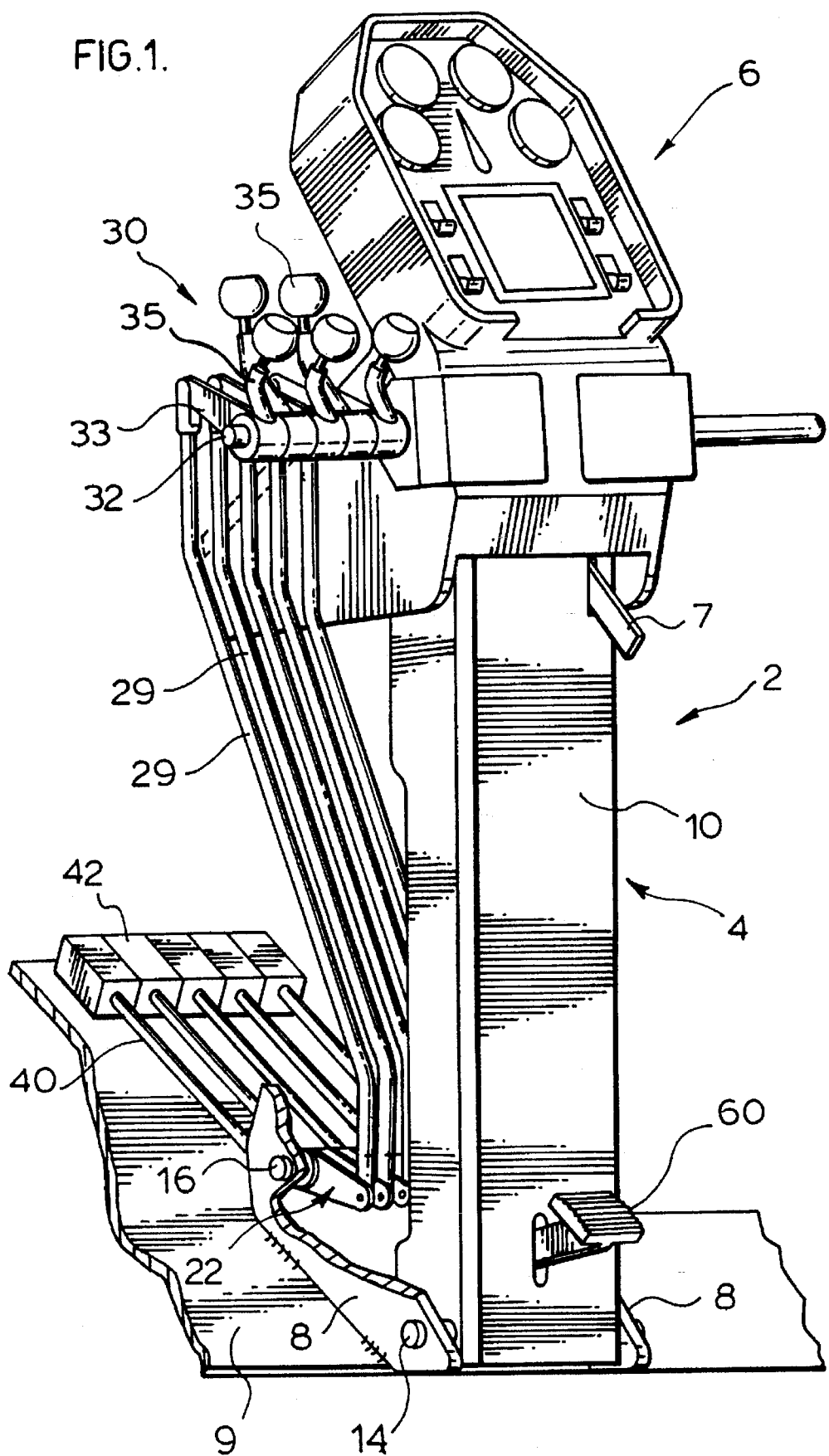
FIG. 1 is a partial perspective view showing the pedestal control console.

The pedestal control console 2 has an upright pivotting portion 4 having a pivotted tilting head 6 secured atop thereof. The upright portion 4 includes a front channel member 10 and a back strut 12. The back strut 12 forms an upright support. The front channel 10 and the back strut 12 are secured to lower pivot shafts 14 and 16, respectively, and allow movement of the upright portion in the fore and aft direction. Adjacent an upper end of the front channel 10 and the back strut 12, upper pivot shafts 18 and 20 serve to connect the tilting head support casting 21 with the front channel 10 and the back strut 12. The tilting head support casting is pivotally secured to back strut 12 and the front channel 10, and at a raised position defines a pivot axis 34 for the tilting head 6. The front channel member 10, the back strut 12 and the head support casting 21 form a trapezoidal linkage.

It can also be seen that the lower pivot shaft 16 carries a plurality of bell cranks 22 to either side of the back strut 12. The lower pivot shafts 14 and 16 are connected to the floor 9 of the grader by means of the upright base plates or floor brackets 8 which are secured to the floor of the grader. In FIG. 1, the floor brackets are directly secured, whereas in FIG. 5, the floor brackets 8 are mechanically secured to brackets 11 by mechanical fasteners 13. The embodiment of FIG. 5 simplifies assembly of the pedestal and securement in the grader, and makes service or replacement of pedestal components convenient. The base plates are spaced apart less than 12 inches.

Each lower bell crank 22 includes a somewhat longer arm extending into the center of the console and a short actuating arm on the opposite side of the pivot location defined by shaft 16. These lower bell cranks are each connected to an upper control levers 30 by control rods 29. These control levers are pivotally mounted on a shaft 32 secured to the tilting head 6. Each control lever includes a stub arm 33 having a distal end connected to a connecting rod 29 which is secured to one of the lower bell cranks 22. The control levers include an actuating arm 35 used by the operator to control a particular grader function. In this way, movement of one of the actuating arms 35 cause movement of the associated stub arm 33, which in turn, via the connecting rod 29, forces the bell crank 22 to pivot about shaft 16. This results in movement of the connecting rod 40 which thereby adjusts the position of a hydraulic valve within hydraulic valve block 42.

The actual control console 2 is located inside the cab of the grader and behind the front window, generally shown as 50. The hydraulic valve block 42 is located exterior to the cab. In addition, the pedestal control console has the steering wheel 19 secured to the tilting head 6 secured to a mounting member 133, which pivots about the axis 34 secured to the tilting head support casting 21 (see FIG. 5). Lever 7 allows the tilting head 6 to be released for pivotting about tilting axis 34 and subsequently locked. Any suitable mechanical locking arrangement can be used. As part of the steering system, a telescopic steering column, generally shown as 46, is connected to the hydraulic steering unit 44. The hydraulic steering unit 44 and the hydraulic valve block 42 can be secured to a portion of the frame 39 of the grader generally on the center line of the grader and exterior to the cab. As can be appreciated, the telescopic steering column 46 extends or retracts as necessary to effect movement of the control console to any of the positions shown in FIGS. 2 through 4 or any position therebetween. As shown, the telescopic steering column has a universal joint coincident with tilting axis 34.

In order to maintain the control console in a desired position, a non-powered hydraulic cylinder, generally shown as 64, is used to provide an adjustable link between the back strut 12 and the front channel 10. It can be seen that the back strut includes a top projecting portion 55 which effectively joins in a pivot connection with the piston 68. The piston 68 moves within the cylinder 66 and is adjustable relative thereto by opening a valve which allows hydraulic fluid to flow from one side of the piston captured within the cylinder to the other side. This hydraulic cylinder preferably includes a gas charge to bias the cylinder in one direction, in this case to the upright position of FIG. 3. In addition, the gas charge can accommodate some movement towards the upright position when sufficient force is exerted thereon. This can reduce injury in an accident. Note that the telescopic steering column is not locked, and therefore, is free to collapse, as required.

The hydraulic cylinder 64 is basically self-contained and merely serves to provide a fixed link when the valve is closed. In order to open and close the valve, a foot pedal 60 is pivotally secured adjacent the base of the front channel 10, and when depressed, opens the valve associated with the cylinder 64. In the open position, the piston can move within the cylinder 66 and assume any position. In order to maintain the position, the foot pedal 60 is released and is spring biased to a position closing the hydraulic valve. A cable 62 serves to link the pedal 60 with the upper end of the piston 68 having a valve actuator associated therewith. Depressing of the pedal opens the valve. The positioning of the cylinder 64 in a generally upright position provides a mechanical advantage with respect to locking and adjustability. Basically, this orientation amplifies the relative movement of the two components.

Figure 5:
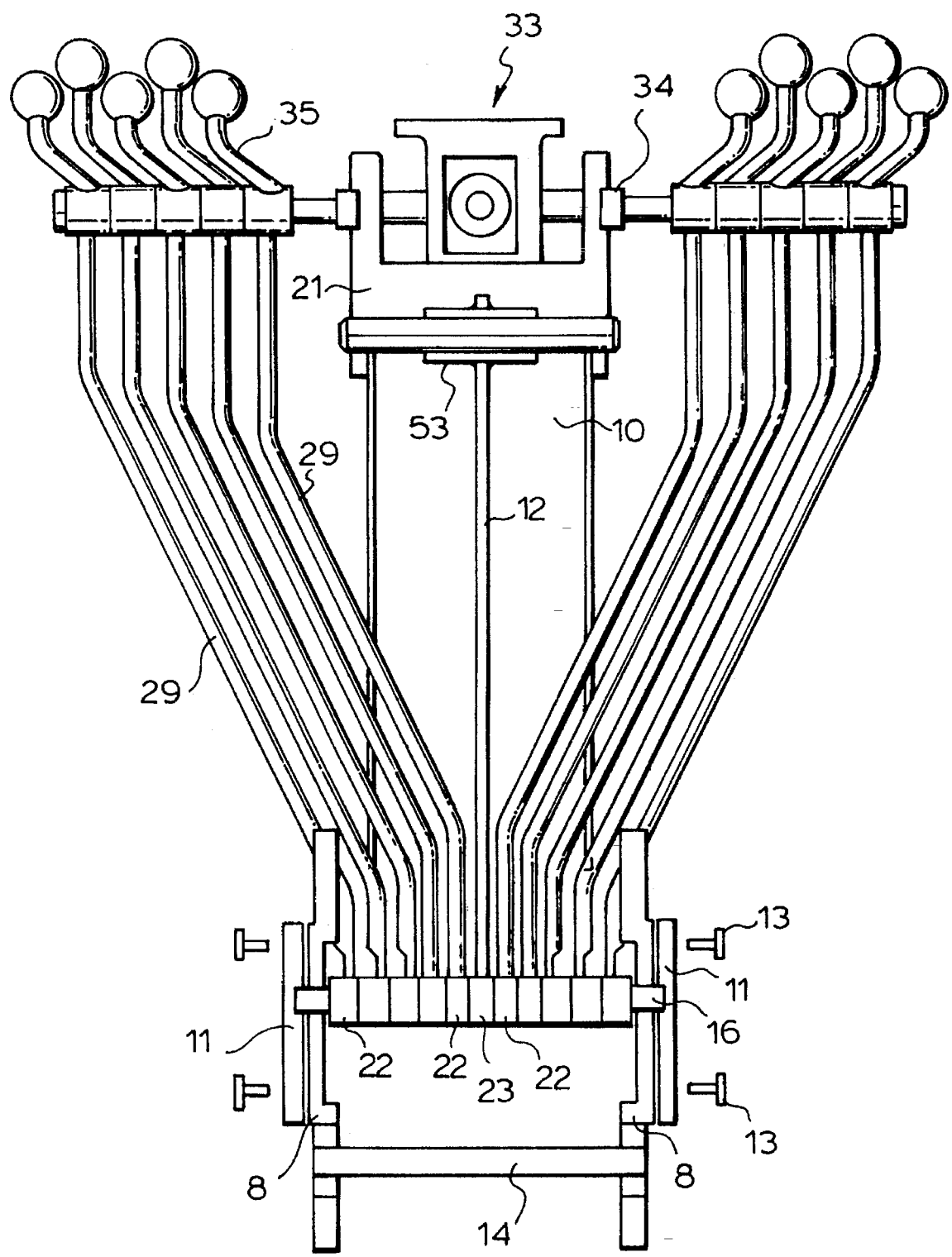
FIG. 5 is a front view of a modified control pedestal with some components removed for clarity.

FIGS. 1 and 5 show the control console and allow a greater appreciation of the constantly decreasing width of the console as it approaches the base of the pedestal. It can be seen that the connecting rods 29 are initially spaced wide either side of the steering wheel to allow easy operator access to the control levers 30, which in turn operate hydraulic valves by means of the lower bell cranks, which are in close spaced proximity at the base of the control console. These bell cranks are carried by the same shaft 16 carrying the back strut 12. The back strut is connected to shaft 16 by a bushing, generally indicated as 13. This allows the strut to be effectively coupled to the grader floor and to be of high rigidity to provide a strong control console which is not subject to damage. The use of this shaft to also carry the bell cranks simplifies the number of components, thus reducing manufacturing costs and also provides good access to the bell cranks provided at the base of the console. Adjustment of any connecting rods can be accommodated at the hydraulic valve block 42 or adjacent the stub arm 33. Therefore, service and adjustment is easily provided according to this design, as the back of the console is essentially open. It is possible to provide a cover, if desired, to partially hide of the operating components within the console, although in many cases, this is not necessary or desirable. The narrow base (preferably less than 12 inches) also improves visibility.

With this arrangement, the control console can be assembled separate and apart from the grader cab and be ready for insertion in the grader cab at the appropriate location on the production line. At this time, the console is located in the cab and the various connections to the hydraulic valve block 42 may be made. This simplifies the time required to effect securement of the console, which is preferably mechanically secured to brackets welded to or integral with the grader floor 9 (see FIG. 5).

FIG. 1 illustrates how the control console has a very narrow front profile defined by the channel 10, which, at the lower end of the console, is quite narrow due to the merging of the connecting rods 29. The back strut 12, which is basically a member orientated at 90° to the front channel, is secured by bushing 23 to the pivot shaft 16 and by bushing 53 to the upper pivot shaft 20. This provides a strong structural relationship which opposes movements of the console from side to side. A motor grader operator has a requirement to look downward past the pedestal and connecting rods to determine his blade position. By bending connecting rods 29 inwardly as shown and providing a narrow pedestal console, improved visibility in the lower region of the console is achieved as well as allowing easy adjustment and service of any connecting rods. It has been found that this arrangement has reduced the number of parts while maintaining satisfactory structural integrity and ease of installation. The foot pedal release 60 allows the operator to use his foot to disengage the lock mechanism and adjust the console forwardly or rearwardly by merely pressing on the steering wheel with both hands free to accomplish this adjustment. Release of the foot pedal 60 automatically places the console in the locked configuration. The cylinder 64 preferably includes a gas charge which urges the control console to the fully upright position of FIG. 3. It can be seen that this is essentially the extended position of the piston cylinder. Such gas springs (i.e. a gas charge and hydraulic cylinder) are known. The operator, when seated, will normally have the pedestal in a position similar to FIG. 2. To leave the cab, the operator depresses the foot pedal and the pedestal will move towards the upright position of FIG. 3. The operator can assist this movement, if desired, by pressing on the steering wheel 19. The operator, upon entering the cab, can sit down, press the foot pedal 60 and pull the steering wheel 19 towards him. The relationship of the foot pedal and operator chair remains generally constant and is easier to use. In most cases, the grader operator is seated during use of the grader. The foot pedal release is particularly convenient when used with a hydraulic locking link and the tilting head assembly.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A pedestal control console comprising two opposed upright base plates, said opposed base plates having two spaced pivot shafts extending thereacross, one of said pivot shafts pivotally securing a panel member which forms one component of a trapezoidal linkage with the other pivot shaft pivotally securing a back upright support which also forms part of said trapezoidal linkage, said panel member and said back upright support each being pivotally connected at a raised position to a steering head located generally atop said trapezoidal linkage, said steering head including control levers positioned either side thereof and pivotal about a common shaft, each control lever when actuated in either a fore or aft direction driving a first connecting rod, each first connecting rod being connected to a bell crank pivotally secured to said other pivot shaft and located between said opposed base plates, said back upright support being centrally disposed on said other pivot shaft with said bell crank being located to either side of said back upright support, each bell crank being connected to a second connecting rod associated with a valve of a hydraulic control valve block, said first connecting rods being bent to form a transition from a wide spacing thereof adjacent the steering head to a narrow spacing between said base plates, and wherein said console includes an adjustable locking link extending between members of said trapezoidal linkage to lock said trapezoidal linkage when said adjustable link is fixed and to allow said trapezoidal linkage to move various position between a fully upright position and a fully reclined position to accommodate different preferences of different operators When said adjustable locking link is free to adjust.

2. A pedestal control console as claimed in claim 1 wherein said back upright support is a plate member with the major surface thereof generally perpendicular to said panel member.

3. A pedestal control console as claimed in claim 2 wherein said adjustable link is an hydraulic cylinder having a foot operated release valve which when open allows adjustment thereof.

4. A pedestal control console as claimed in claim 3 including a telescopic steering column which extends and retracts in accordance with movement of said pedestal control console and connects to an exterior hydraulic steering unit.

5. A pedestal control console as claimed in claim 4 secured in a cab of a motor grader, and wherein said hydraulic steering unit and said hydraulic control valve block are positioned exterior to the cab.

6. A pedestal control console as claimed in claim 2 wherein said adjustable link is a gas spring hydraulic cylinder having a release valve controlled by a foot pedal located adjacent and projecting to both sides of said panel.

7. A pedestal control console as claimed in claim 1 wherein said base plates are adapted to be releasably mechanically secured to mounting flanges fixed to a floor of a cab of a machine.

8. A pedestal control console as claimed in claim 7 wherein base plates are spaced apart less than 12 inches.

9. A pedestal control console as claimed in claim 7 wherein said adjustable link is a gas spring hydraulic cylinder having a release valve controlled by a foot pedal located adjacent and projecting to both sides of said panel.

10. A pedestal control console as claimed in claim 8 wherein said adjustable link is a gas spring hydraulic cylinder having a release valve controlled by a foot pedal located adjacent and projecting to both sides of said panel.

11. A pedestal control console as claimed in claim 1 wherein said steering head located generally atop said trapezoidal linkage is separately tiltable.

* * * * *